No. 879,745. PATENTED FEB. 18, 1908.
J. W. COOPER.
THAWING DEVICE.
APPLICATION FILED MAY 13, 1907.
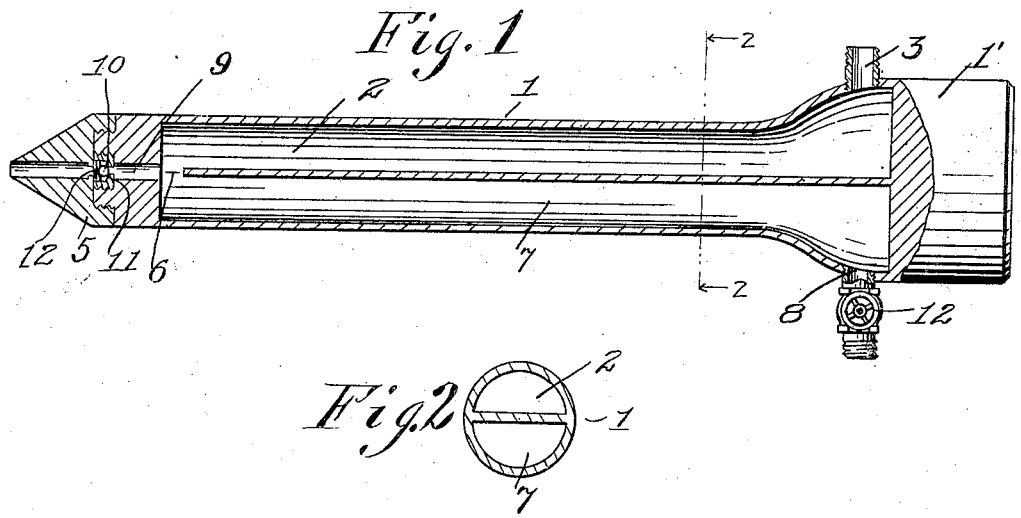
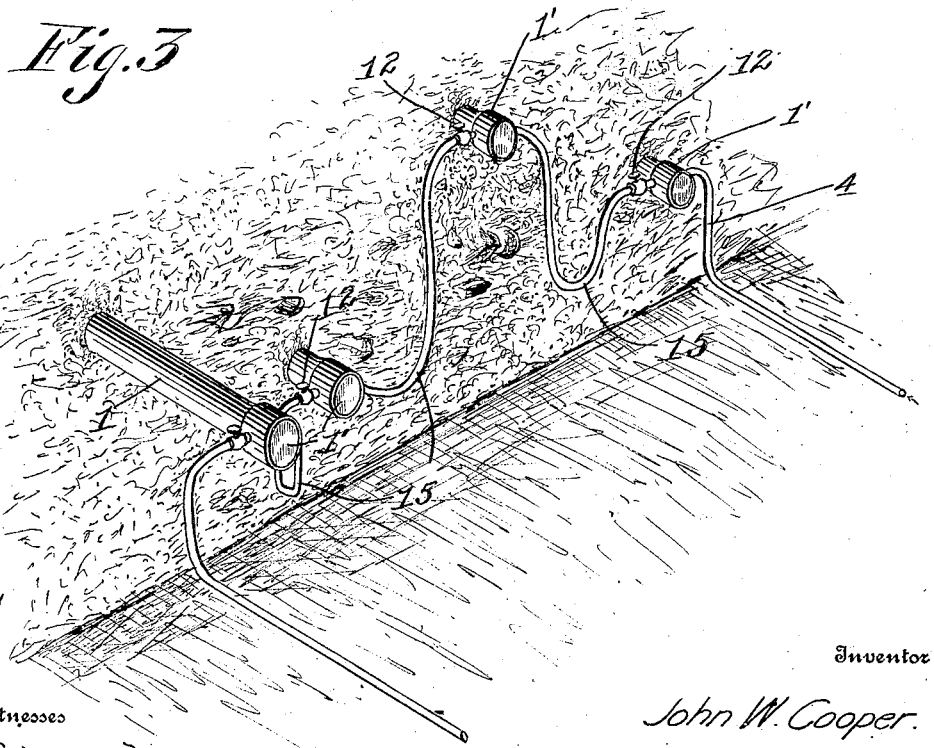
Witnesses
Edward W. Cressman.
Arbita Adams.
Inventor
John W. Cooper.
By Adams & Brooks
Attorneys

UNITED STATES PATENT OFFICE.

JOHN W. COOPER, OF SEATTLE, WASHINGTON.

THAWING DEVICE.

No. 879,745.　　　　Specification of Letters Patent.　　　Patented Feb. 18, 1908.

Application filed May 13, 1907. Serial No. 373,508.

*To all whom it may concern:*

Be it known that I, JOHN W. COOPER, a citizen of the United States of America, and a resident of the city of Seattle, in the county of King and State of Washington, have invented certain new and useful Improvements in Thawing Devices, of which the following is a specification.

My invention relates to improvements in apparatus for thawing frozen ground so that it can be worked and properly treated to extract ores therefrom, and has for its primary object the provision of a comparatively simple construction which is heated by steam caused to circulate therethrough.

A further object resides in the provision of a novel constructed through the medium of which steam admitted into the body of the device can be directed for discharge against the material in front of the working point or caused to travel back through the body of the device to a discharge port positioned adjacent the head or outer end portion of the device.

With the above and other desirable objects in view, to be referred to as the description progresses, the invention resides in constructions, parts and combinations of parts hereinafter described and succinctly defined in the appended claims.

Referring now to the accompanying drawing, in which like numerals of reference indicate like parts throughout the several views: Figure 1 is a longitudinal section view of one of my improved devices. Fig. 2 is a section taken on line 2—2 thereof, and Fig. 3 is a view in perspective showing a plurality of my devices in operation and coupled to receive steam from a common source of supply, one of said devices being illustrated as being but partly driven into the frozen earth.

My improved thawing device comprises an elongated body 1, provided on its outer portion with a head or impact part 1' and having a longitudinal steam conduit 2, in communication at its outer end portion with an inlet port 3 through which steam is admitted, as from a flexible pipe 4 leading from a suitable source of supply (not shown). Conduit 2 extends in proximity to the working point 5 of the device and is connected by a short cross conduit 6 with a return conduit 7 which is provided with an outlet port 8, at a point substantially opposite port 3.

Reference numeral 9 indicates a conduit communicating with conduit 6 and extending through working point 5 so as to direct steam for discharge in front thereof to thaw the frozen ground, and a ball valve 10 is arranged in said conduit 9 to control the flow of steam therethrough. Valve 10 is held against its seat 11, by a coil spring 12 whose strength is such, as to prevent steam under a predetermined pressure escaping through conduit 9 when valve 12 in outlet port 8 is open.

Suitable outwardly projecting nipples, are provided in ports 3 and 8 to which flexible pipes 4 and 15 are secured. Pipes 15, as will be observed, extend from the outlet port of one device to the inlet port of the next one, so that steam after having circulated through one device can be caused to travel through any number of additional devices, as will readily be understood.

In operation, one of the devices is forced into the earth by blows from a sledge or the like delivered on head or impact part 1', valve 12 being closed so that the steam will be allowed to flow through conduit 6, until the device is driven well into the earth as illustrated in Fig. 3, then another device is started, this being coupled to the first device by a flexible pipe 15 and valve 12 in said first device is then opened so that the steam will flow from first device into the second device and be discharged through conduit 6 thereof. This operation is continued with respect to any additional devices, it being understood that the valve 12 of a device is kept closed until the device is driven approximately its length into the material being thawed, then said valve is opened so that steam circulating through said device, instead of passing through conduit 6 will escape through outlet port 8 into the next device. In this manner, a number of devices after having been driven home, can be maintained in a heated condition for any desired period of time. Point 5 is preferably removably secured to body 1, as shown, so that it can be readily replaced when broken or worn.

Having thus described my invention, what I claim as new, and desire to secure by Letters Patent of the United States of America, is:—

1. A device of the character described comprising an elongated body provided with a working point and having an impact part at its outer portion, said body being formed with inlet and outlet ports and a conduit extending from said inlet port to said outlet port and being in communication therewith, the working point of said body being formed with a conduit communicating with said first named conduit at a point between the inlet and outlet ports of said body, for the purpose specified.

2. A device of the character described comprising an elongated body provided at its outer portion with an impact part and having a working point, said body being formed with inlet and outlet ports, a conduit in communication with said inlet and outlet ports and a conduit extending through the working point of said body and communicating with said first conduit at a point between the inlet and outlet ports of said body, and a valve in said last named conduit, for the purpose specified.

3. A device of the character described comprising an elongated body having a working point, and provided with a conduit extending through said working point, and a valve in said conduit, said body being formed in its upper portion with inlet and outlet ports and having a conduit in communication with said inlet and outlet ports in said body and with said first named conduit, for the purpose specified.

4. A device of the character described comprising an elongated body having a working point and provided with a conduit extending through said working point, a spring pressed inwardly closing valve in said conduit, said body being provided adjacent its outer end portion with inlet and outlet ports and having conduits leading therefrom to said first named conduit, and a valve in said outlet port, for the purpose specified.

5. An apparatus of the character described comprising a plurality of elongated bodies each having a working point and provided with inlet and outlet ports, a pipe leading from the exhaust port of one of said bodies to the inlet port of another, there being a conduit in each of said bodies in communication with the inlet and outlet ports thereof and extending through its working point, and a valve in said conduit for controlling the flow of steam therethrough.

Signed at Seattle, Washington this 4th day of May 1907.

JOHN W. COOPER.

Witnesses:
   JOHN W. FILKINS,
   S. B. FOLEY.